United States Patent [19]
Seibold et al.

[11] Patent Number: 6,064,781
[45] Date of Patent: May 16, 2000

[54] MICRO-OPTIC DEVICE WITH MEANS FOR PRECISELY POSITIONING MICRO-OPTIC COMPONENTS

[75] Inventors: Gerhard Seibold, Remseck; Jörg Hehmann, Nürnberg, both of Germany

[73] Assignee: Alcatel, Paris, France

[21] Appl. No.: 09/005,267

[22] Filed: Jan. 9, 1998

[30] Foreign Application Priority Data

Jan. 10, 1997 [DE] Germany .......................... 197 00 549

[51] Int. Cl.⁷ .................................................. G02B 6/12
[52] U.S. Cl. .............................. 385/14; 385/49; 385/52
[58] Field of Search ........................... 385/14, 49, 52, 385/59, 62, 63, 65, 67, 69, 15, 81, 129, 130, 132

[56] References Cited

U.S. PATENT DOCUMENTS

| | | | |
|---|---|---|---|
| 5,123,073 | 6/1992 | Pimpinella | 385/59 |
| 5,218,663 | 6/1993 | Isono et al. | 385/129 |
| 5,257,332 | 10/1993 | Pimpinella | 385/59 |
| 5,453,827 | 9/1995 | Lee | 356/73.1 |
| 5,937,114 | 8/1999 | Fisher et al. | 385/14 |

FOREIGN PATENT DOCUMENTS

| | | |
|---|---|---|
| 0200848 | 11/1986 | European Pat. Off. . |
| 2515828 | 10/1975 | Germany . |
| 3626471 | 2/1987 | Germany . |
| 3909293 | 10/1989 | Germany . |
| 4117333 | 12/1991 | Germany . |
| 4120411 | 1/1992 | Germany . |
| 4226608 | 2/1993 | Germany . |
| 4342844 | 6/1995 | Germany . |
| 1-113703 | 5/1989 | Japan . |
| 7-063966 | 3/1995 | Japan . |
| 8-062479 | 3/1996 | Japan . |
| 9615467 | 11/1995 | WIPO . |

*Primary Examiner*—Phan T. H. Palmer
*Attorney, Agent, or Firm*—Ware, Fressola, Van Der Sluys & Adolphson LLP

[57] ABSTRACT

The invention concerns a device whereby micro-optic parts, particularly those that tend to tilt because of their geometric dimensions, can be precisely arranged on a support. The device according to the invention comprises a support (TR) on which several guide elements (FE1 . . . FE4) are placed in cutouts (A1 1 . . . A4). The arrangement of the guide elements (FE1 . . . FE4) is such that the micro-optic part (BT) to be positioned can be inserted between the guide elements (FE1 . . . FE4). In this way an active adjustment is not required. In a particularly advantageous embodiment of the invention, the guide elements (FE1 . . . FE4) touch the micro-optic part (BT) at points that are located at different distances from the surface of the support (TR). In this way tilting is prevented in a particularly effective manner. The support (TR) is made of a silicon substrate for example; the guide elements (FE1 . . . FE4) can be uncoated spherical lenses which are placed in cutouts etched into the substrate by means of wet chemical methods.

13 Claims, 3 Drawing Sheets

6,064,781

MICRO-OPTIC DEVICE WITH MEANS FOR PRECISELY POSITIONING MICRO-OPTIC COMPONENTS

TECHNICAL FIELD

The invention concerns a device for the precise arrangement of micro-optic parts on a support. The micro-optic parts to be arranged can be interference filters, micromirrors, optical gratings or diffusion lenses for example. The support can be a micro-optic base made of a single silicon crystal.

BACKGROUND OF THE INVENTION

If several micro-optic parts are to be assembled into a unit, these parts as a rule must be very precisely aligned with each other and subsequently secured in this position. Particularly if light is to be coupled into the optical fiber, tolerances on the order of magnitude of 1 μm and lower must be maintained. Active adjusting methods have been proven, whereby the parts are inserted into the optical path and are adjusted in their installed position until the light beam has the desired characteristics. This is usually a very time-consuming manual labor, whereby the parts are adjusted by means of highly precise positioning units while a suitable measuring instrument is constantly observed.

An electro-optical module is known from patent disclosure No. DE-C1-43 42 844 (Honsberg et al), in which microlenses inserted into cutouts are used as a stop for a laser lock. This achieves a precisely defined distance between the laser lock and the imaging lenses placed before it, which are also inserted into the cutouts. The laser lock must be actively adjusted in the lateral direction, i.e. vertically to the propagation direction of the emitted light.

A device for arranging a block-shaped part on a silicon support is known from U.S. Pat. No. 5,453,827 (Lee). FIG. 5 shows a side view of this arrangement. The substrate SUB has a rectangular cutout AUS, into which the block-shaped part FIL—in this case an interference filter—is inserted. After the insertion, the part FIL is actively adjusted and cemented to the bonding areas KLE. The rectangular cutout is usually produced by means of a precision saw cut. The production of such a saw cut is very expensive since the actual width B of the cutout can only deviate slightly from the specified width. If the cutout is too wide the part FIL has too much play in the cutout, which makes the active adjustment more difficult. On the other hand, if the cutout is too narrow the part cannot be inserted into the cutout.

With an accurately produced saw cut and low production tolerances for the part, the side walls of the part are not flat against the side walls of the saw cut, but are separated by a thin air gap, as is made clear in the enlarged illustration of FIG. 4. In addition, since the surface on which the part rests is uneven due to the sawing, the position of the part in the sawed cutout cannot be accurately established. This is also the reason why an active adjustment cannot be omitted in this case.

SUMMARY OF THE INVENTION

It is therefore the object of the invention to present a device whereby micro-optic parts can be precisely positioned on a support without requiring an active adjustment. The device makes it especially possible to arrange thin block-shaped micro-optic parts, such as interference filters, in a mechanically stable form on a support.

The invention achieves this object by a device for the precise arrangement of a micro-optic part on a support, wherein the support has cutouts into which guide elements are placed and the micro-optic part is arranged between them. According to the invention the support has cutouts into which guide elements are placed. Preferably the guide elements have a spherical or cylindrical shape. The guide elements and the cutouts which receive them are arranged so that the micro-optic part being positioned can be inserted between the guide elements, i.e. in the final position the guide elements surround the micro-optic part on several sides. This arrangement of the guide elements does not allow any shifting of the micro-optic part thereby impairing the function of the part.

In a particularly advantageous embodiment of the invention, the micro-optic part is a thin wafer which stands upright on the support. To prevent the wafer from tilting, the invention provides guide elements on both sides of the wafer. The dimensions of the guide elements are preferably such that the points at which the guide elements touch the wafer are located at different distances from the support surface. This arrangement of the supporting points prevents the wafer from executing rotating movements around its diagonal in space.

BRIEF DESCRIPTION OF THE DRAWINGS

The invention is explained in detail in the following by means of the embodiments and the drawings, wherein:

FIG. 3b is a front view of the embodiment illustrated by a top view in FIG. 3a.

BEST MODE FOR CARRYING OUT THE INVENTION

Figure 1:
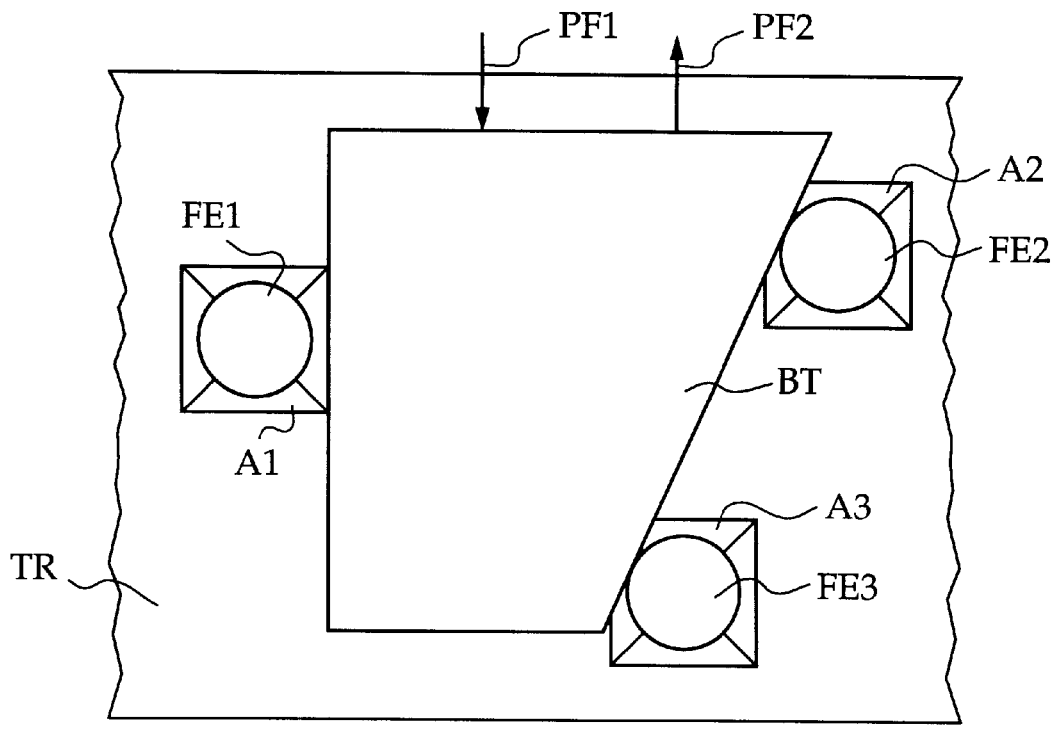
FIG. 1 is a top view of an embodiment of the invented device in which a deviation prism is positioned by means of three spherical guide elements.

FIG. 1 is a top view of a first embodiment of the invention. A micro-optic part BT rests on a support TR. Three guide elements FE1 ... FE3, which are inserted into appropriately shaped cutouts A1 ... A3, are used as stops for the micro-optic part BT. Because of the arrangement of the guide elements FE1 ... FE3 on the support, the part can only be moved on the surface of the support TR in the direction indicated by the arrow PF2. The micro-optic part BT is preferably pushed from the side onto the support TR, namely in the direction of the arrow PF1. As will be explained further on, since the guide elements and the pertinent cutouts can be manufactured very precisely, the micro-optic part BT can be passively adjusted with great precision on the support. After the lateral insertion, the micro-optic part BT can be secured, for example, by cementing.

In the embodiment of the invention illustrated in FIG. 1 the support is a single silicon crystal. Such a single silicon crystal makes it possible to manufacture the cutouts A1 ... A3 very precisely by means of wet chemical etching methods which may require several steps. The cutouts then have the form of pyramid frustums and are therefore particularly well suited to receive spherical guide elements. In this case the micro-optic part BT to be positioned is a deviation prism. The flat underside of this deviation prism BT lies flush against the plane surface of the support TR.

Figure 2:
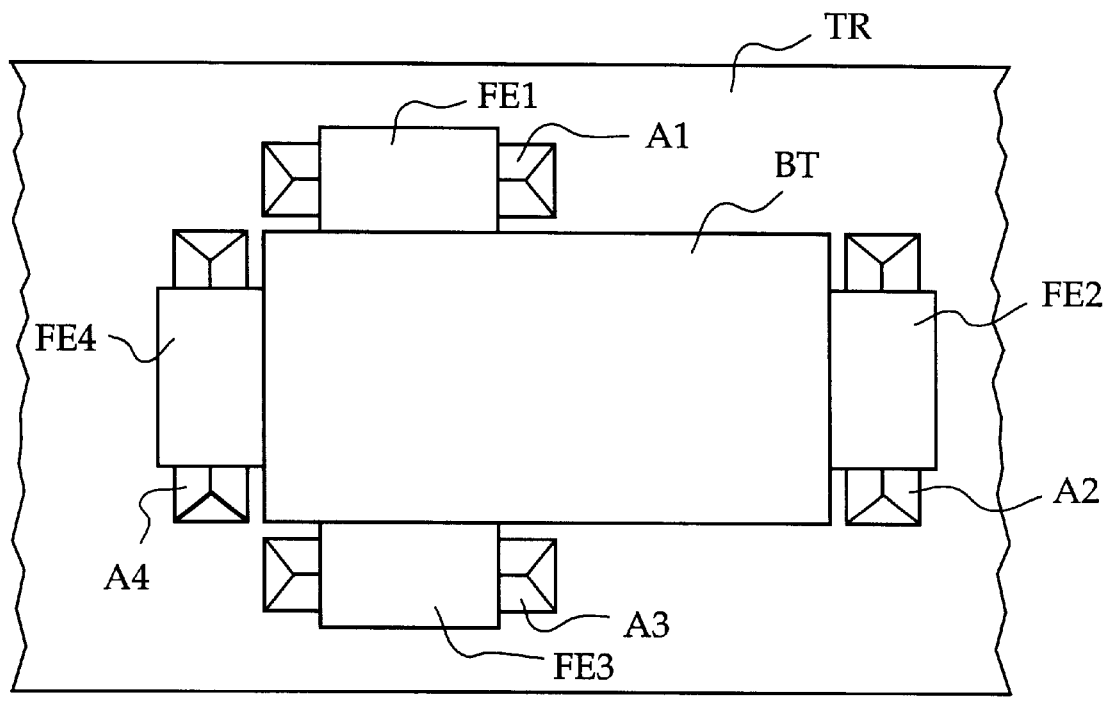
FIG. 2 is a top view of an embodiment of the invented device in which a block-shaped micro-optic part is positioned by means of four cylindrical guide elements.

FIG. 2 illustrates a second embodiment in which the guide elements have a cylindrical shape. Four cutouts A1 . . . A4 are arranged around a block-shaped micro-optic part ET which rests on the support TR. A cylindrical guide element FE1 . . . FE4 is inserted into each cutout. When the micro-optic part BT is placed on the support TR from above, the guide elements FE1 . . . FE4 hold the part BT in an exact position from which no further movement is possible. In this embodiment the cylindrical guide elements FE1 . . . FE4 are short sections of optical fibers; the cutouts A1 . . . A4 have the form of V-shaped grooves and are etched into the silicon support TR by means of wet chemical methods.

Figure 3A:
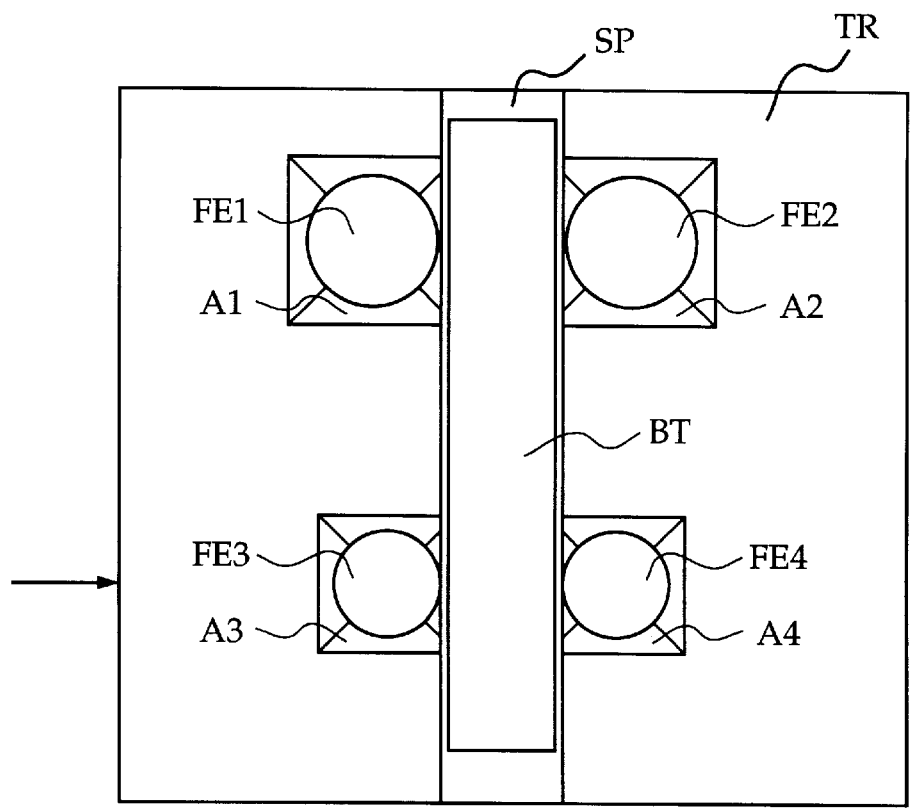
FIG. 3a is a top view of an embodiment of the invented device wherein a thin wafer which is inserted into a gap is positioned by means of four spherical guide elements.
Figure 3B:
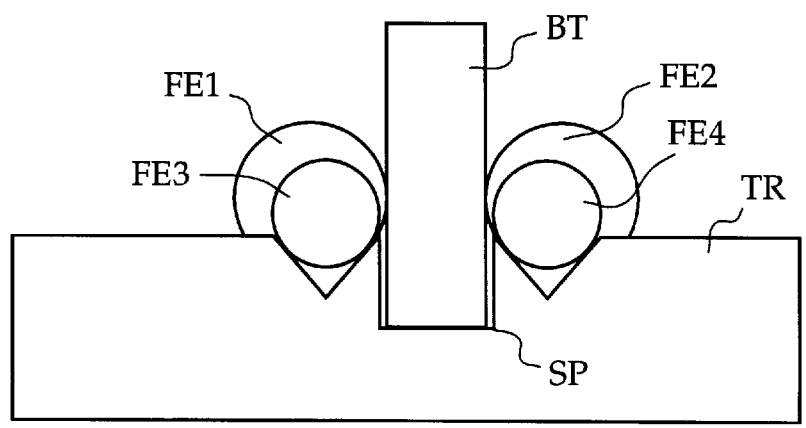
Figure 4:
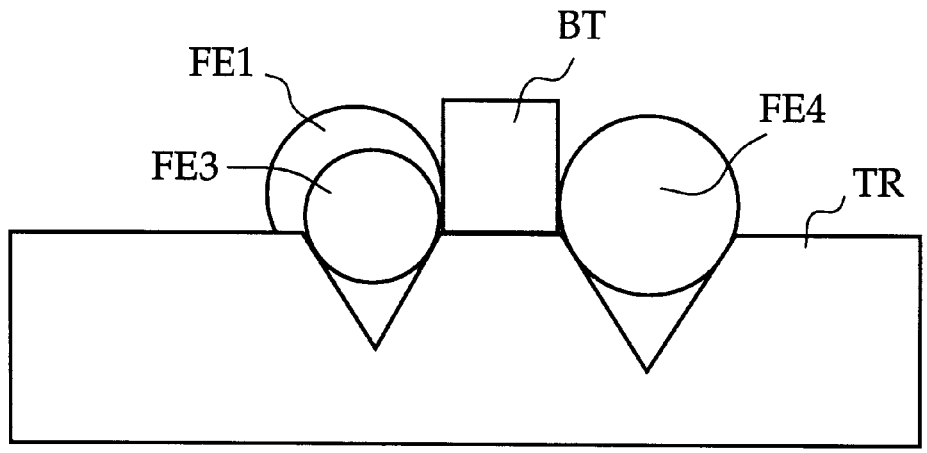
FIG. 4 is a front view of an embodiment of the invented device wherein a thin wafer that is placed on a support is positioned by means of four spherical guide elements.
Figure 5:
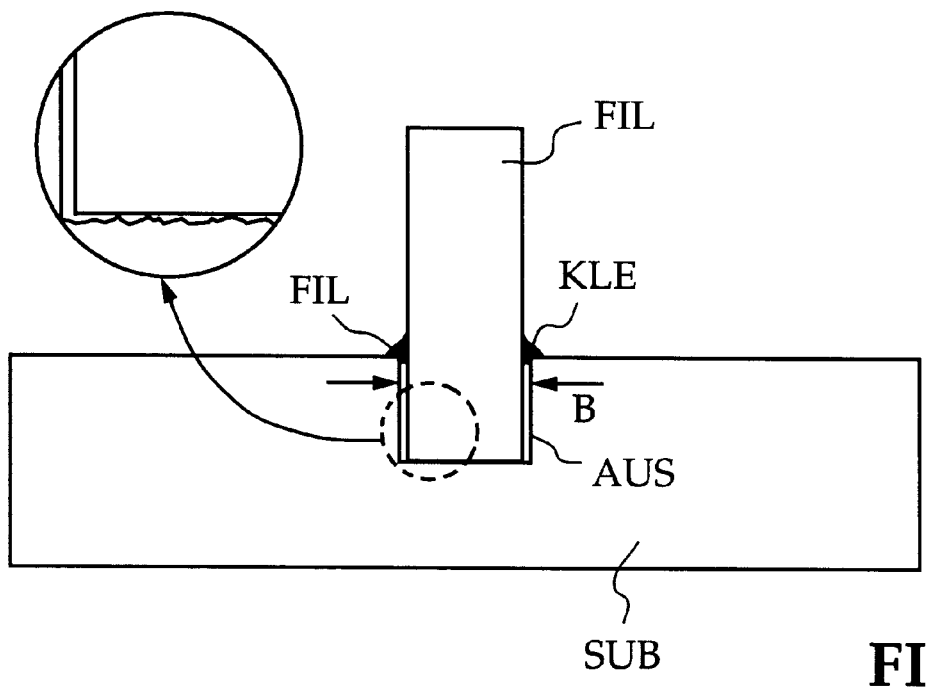
FIG. 5 is a front view of the device according to the state of the art, wherein a thin wafer is inserted into a gap.

FIGS. 3a and 3b illustrate a particularly advantageous embodiment of the invention. In this case the micro-optic part BT to be positioned is a thin wafer, possibly an interference filter. As can be seen in the front view of FIG. 3b, the wafer BT stands upright on the support TR. Because of the narrow support surface and the center of gravity which is located high above the surface of the support TR, the wafer tends to tilt on the support. If the center of gravity is not too high above the surface of the support, the wafer can be positioned directly on the plane surface of support TR as shown in FIG. 4. But with the embodiment as illustrated in FIGS. 3a and 3b, the center of gravity is very high above the surface of the support. In that case it is more favorable to provide the support with a slot-shaped cutout and to insert the wafer into this cutout. This lowers the center of gravity as illustrated in the drawings. As a result the wafer can be mechanically stabilized by support points located substantially above the surface of the support, and tilting in particular is prevented.

According to the invention the support points are located on both sides of the wafer BT. Spherical guide elements FE1 . . . FE4, which are placed into the cutouts A1 . . . A4, touch the platelet BT at four points. The support points, i.e. the points at which the guide elements FE1 . . . FE4 touch the wafer BT, are preferably located at different distances from the surface of the support TR. This can be accomplished with spherical guide elements FE1 . . . FE4 that have different diameters. As can be seen in FIG. 3a, if the guide elements FE1 and FE2 have a larger diameter than the other two guide elements FE3 and FE4, this does not only prevent tilting movements effectively around the longitudinal axis, but also around the diagonal space axis of the wafer BT. In this way a single position can be achieved even if the wafer BT is not positioned flat on the surface of the support TR or on the bottom surface of the slot-shaped cutout. Active adjusting steps are therefore superfluous.

Selecting the position of the support points selected depends above all on the geometry of the micro-optic part. Under some conditions it may be more favorable not to arrange the higher support points next to each other but crosswise, as illustrated in the front view of FIG. 4. In this case the support points which are arranged at different heights are directly opposite each other. A guide element FE1 with a larger diameter is located on the side with the small guide element FE3; in FIG. 4 the guide element FE4 covers the smaller guide element FE2 located behind it.

It is understood that the realization of the invention is not limited to the embodiments described herein. Multiple variations of the embodiments are possible and useful. It is particularly advantageous to use the invention when micro-optic parts, which are tall and have a small base area, must be positioned on a support. This applies for example to diffusion lenses, optical gratings and mirrors. Sections of optical transmission fibers or uncoated microlenses are particularly good guide elements, which are manufactured very precisely and are still cost-effective. But the invention is not limited to spherical or cylindrical guide elements. Guide pins can also be used as guides e.g., where their cross section has the shape of a polygon, and which are used to align units in optical modules, for example.

What is claimed is:

1. A device for the precise arrangement of a micro-optic part (BT) on a support (TR), characterized in that the support (TR) has cutouts (A1 . . . A4) into which guide elements (FE1 . . . FE4) are placed and the micro-optic part (BT) is arranged to be in direct contact with the guide elements for alignment.

2. A device as claimed in claim 1, wherein the guide elements (FE1 . . . FE4) have a spherical or cylindrical shape.

3. A device as claimed in claim 2, wherein the points on the surface of the micro-optic part (BT) at which the micro-optic part (BT) touches the support (TR) and the guide elements (FE1 . . . FE4) are arranged so that the micro-optic part (BT) cannot rotate around any axis in space.

4. A device as claimed in claim 3, wherein the points at which the micro-optic part (BT) touches the guide elements (FE1 . . . FE4) are located at different distances from the particular surface of the support (TR) on which the micro-optic part (BT) rests.

5. A device as claimed in claim 4, wherein the support (TR) is made of silicon.

6. A device as claimed in claim 5, wherein the guide elements are microspheres (FE1 . . . FE3) or sections of optical fibers (FE1 . . . FE4).

7. A device as claimed in claim 6, wherein the micro-optic part (BT) is an interference filter.

8. A device as claimed in claim 2, wherein
the support (TR) is a silicon substrate;
the guide elements (FE1 . . . FE4) are microspheres;
the micro-optic part (BT) is block-shaped;
there are two cutouts each (A1, A3; A2, A4) on two opposite sides of the micro-optic part (BT);
and the geometry of the cutouts and the microspheres is chosen so that the points at which the microspheres touch the micro-optic part are located at different distances from the support surface.

9. A device as claimed in claim 1, wherein the points on the surface of the micro-optic part (BT) at which the micro-optic part (BT) touches the support (TR) and the guide elements (FE1 . . . FE4) are arranged so that the micro-optic part (BT) cannot rotate around any axis in space.

10. A device as claimed in claim 1, wherein the points at which the micro-optic part (BT) touches the guide elements (FE1 . . . FE4) are located at different distances from the particular surface of the support (TR) on which the micro-optic part (BT) rests.

11. A device as claimed in claim 1, wherein the support (TR) is made of silicon.

12. A device as claimed in claim 1, wherein the guide elements are microspheres (FE1 . . . FE3) or sections of optical fibers (FE1 . . . FE4).

13. A device as claimed in claim 1, wherein the micro-optic part (BT) is an interference filter.

* * * * *

UNITED STATES PATENT AND TRADEMARK OFFICE
CERTIFICATE OF CORRECTION

PATENT NO. : 6,064,781
DATED : May 16, 2000
INVENTOR(S) : Gerhard Seibold
Jorg Hehmann It is certified that error appears in the above-identified patent and that said Letters Patent is hereby corrected as shown below:

On the Cover Page [57] Abstract, line 6, after "Al", please delete "1"

Signed and Sealed this

Twentieth Day of March, 2001

Attest:

NICHOLAS P. GODICI

*Attesting Officer*     *Acting Director of the United States Patent and Trademark Office*